JOHN D. BROWNE.
Improvement in Furniture-Casters.

No. 128,107. Patented June 18, 1872.

Witnesses
Joseph Moses
Henry Davis

Inventor
John Daniel Browne 128,107

UNITED STATES PATENT OFFICE.

JOHN DAVID BROWNE, OF MADISONVILLE, OHIO.

IMPROVEMENT IN FURNITURE-CASTERS.

Specification forming part of Letters Patent No. 128,107, dated June 18, 1872.

SPECIFICATION.

I, JOHN DAVID BROWNE, of Madisonville, in the county of Hamilton and State of Ohio, have invented a new and useful Improvement in the Construction of Rollers for Furniture.

The nature and object of the improvement are to cast the journal-holes entirely through the side plates of the frame that carries the wheel without using separate cores, which considerably reduces the cost of manufacture. The following is a description of the same, reference being had to the accompanying drawing making part of this specification.

Figure 1:
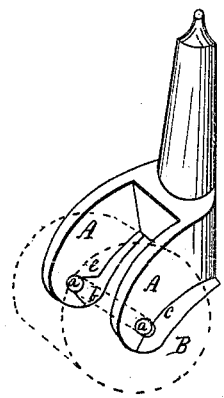
Figure 2:
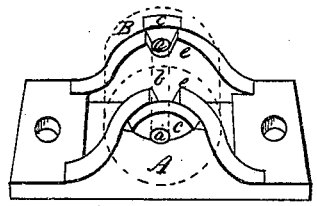
Figure 3:
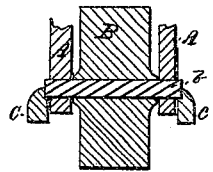

Figure 1 is a perspective view of a rotary frame, showing the improvement. Fig. 2 is a perspective view of a stationary frame with the improvement. Fig. 3 is a cross-section through the center of the axle $b$.

A A are the side plates of the frame which carries the axle $b$ of the wheel B. These side plates have U-shaped notches made on the edge, as shown at $e$, which form part of the holes $a\ a$. On the outside of the side plates A A are projections $c\ c$, having also notches which correspond with the notches at $e$, forming the recessed holes $a\ a$ entirely through the side plates A A, ready to receive the axle $b$ of the wheel B, which may be secured in place in the usual ways.

The journal-holes of casters have been cast with loose cores, and also with chills to dispense with the drilling. I do not claim these.

What I claim as my invention is—

The recessed journal-holes $a\ a$ through the frame, in the manner set forth and substantially as described.

JOHN DAVID BROWNE.

Witnesses:
 JOSEPH MOSES,
 HENRY DAVIS.